Feb. 1, 1927. 1,616,067
H. E. SOMES
ELONGATED ELECTRICALLY HEATED OVEN
Filed April 7, 1924    4 Sheets-Sheet 2
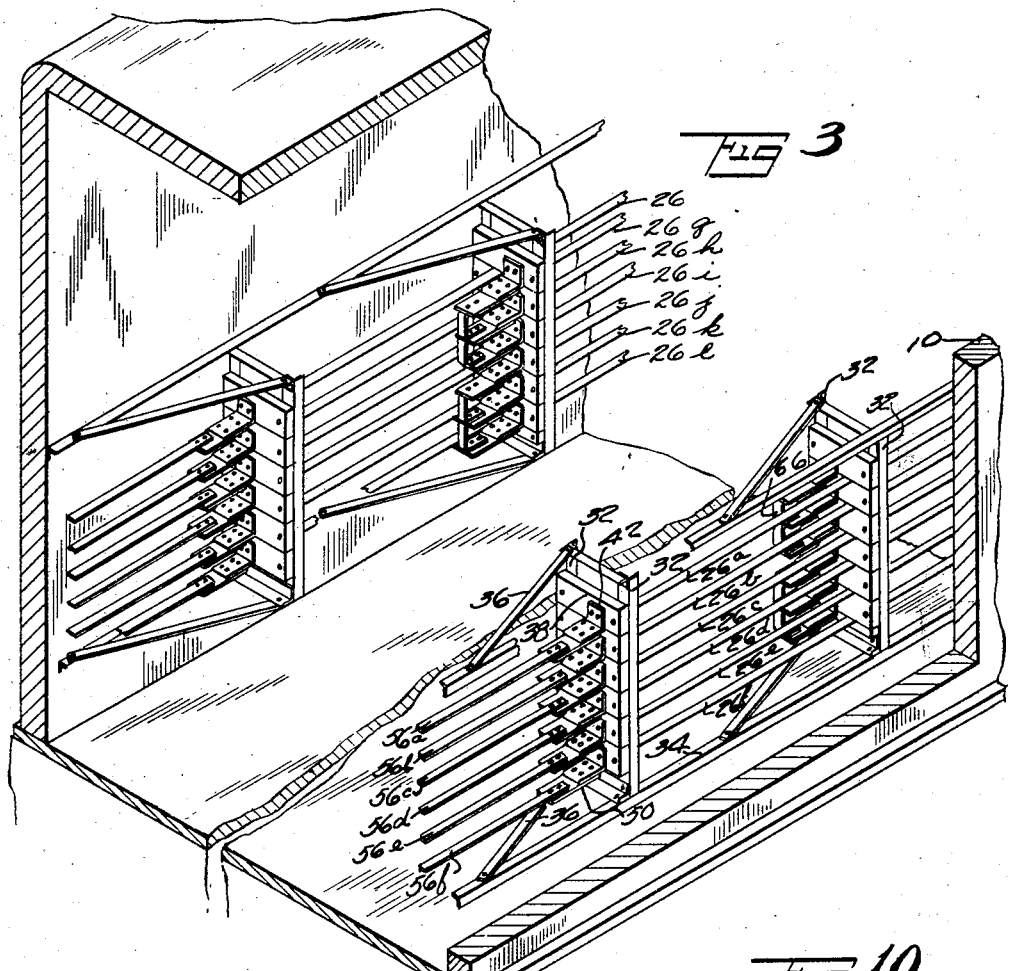
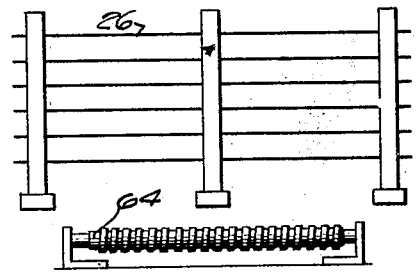
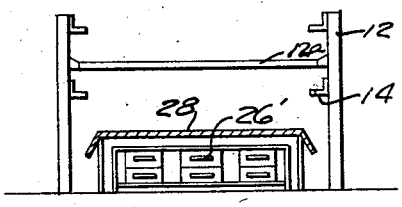
INVENTOR
Howard E. Somes.
BY H. H. Dyke
ATTORNEY

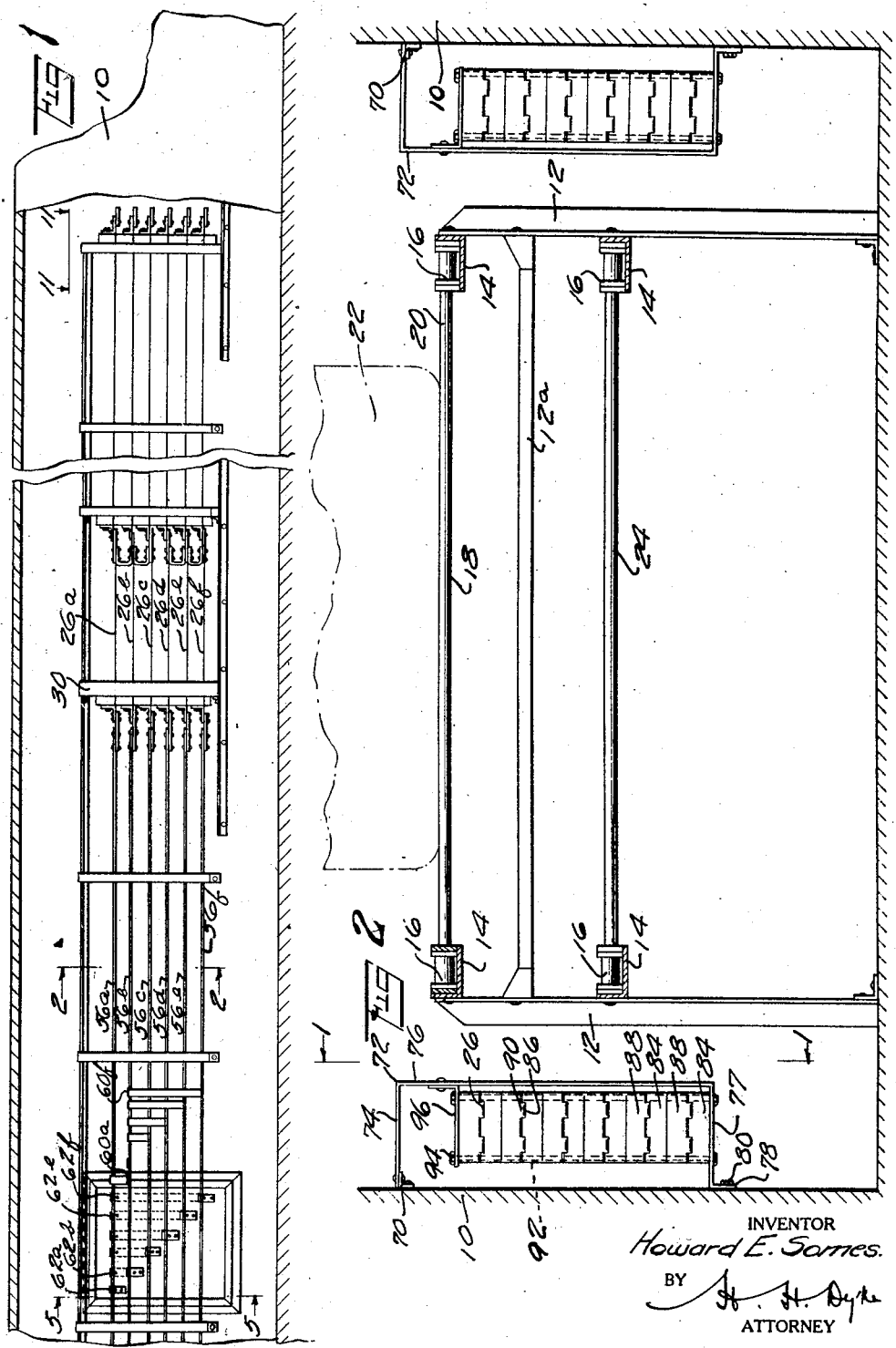

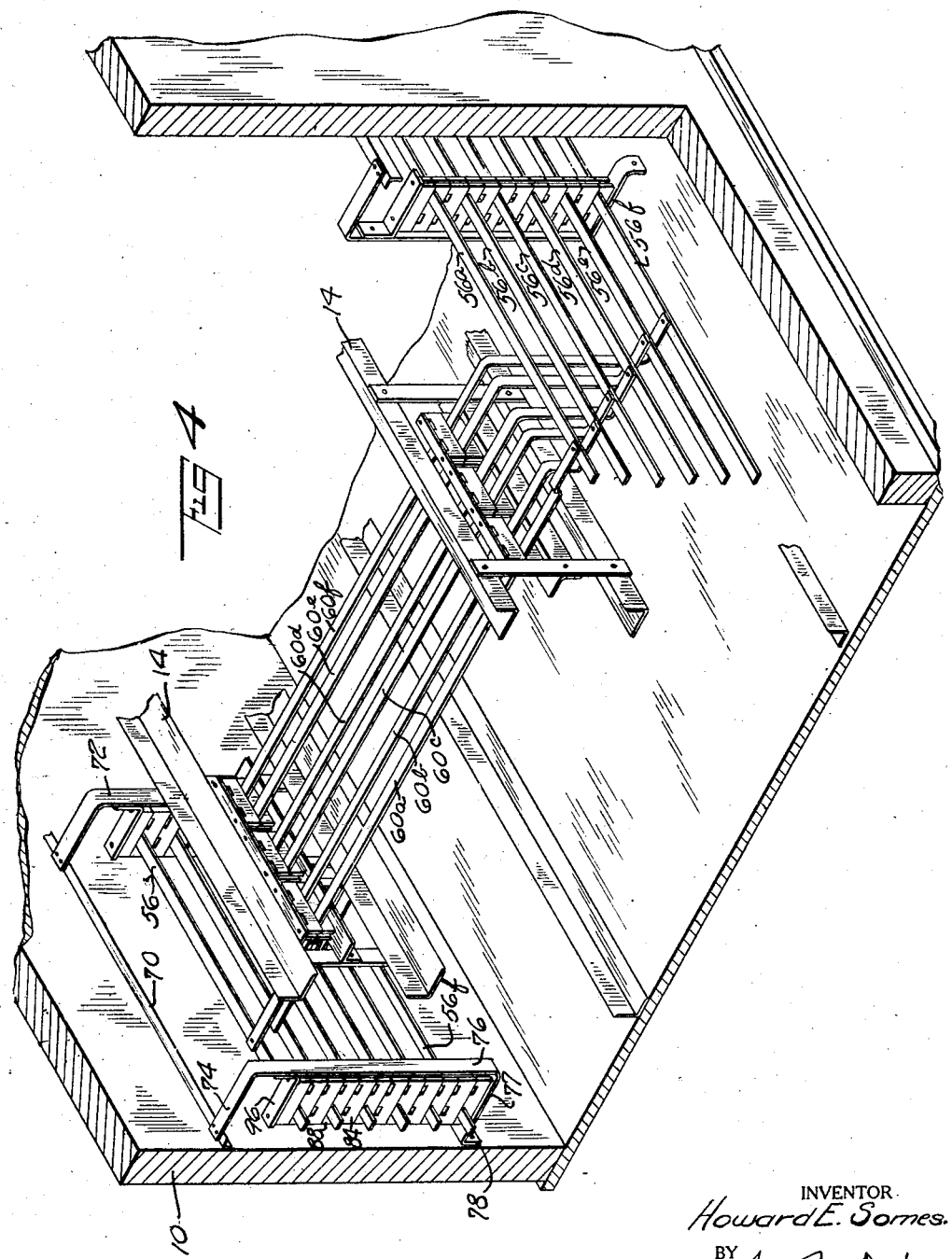

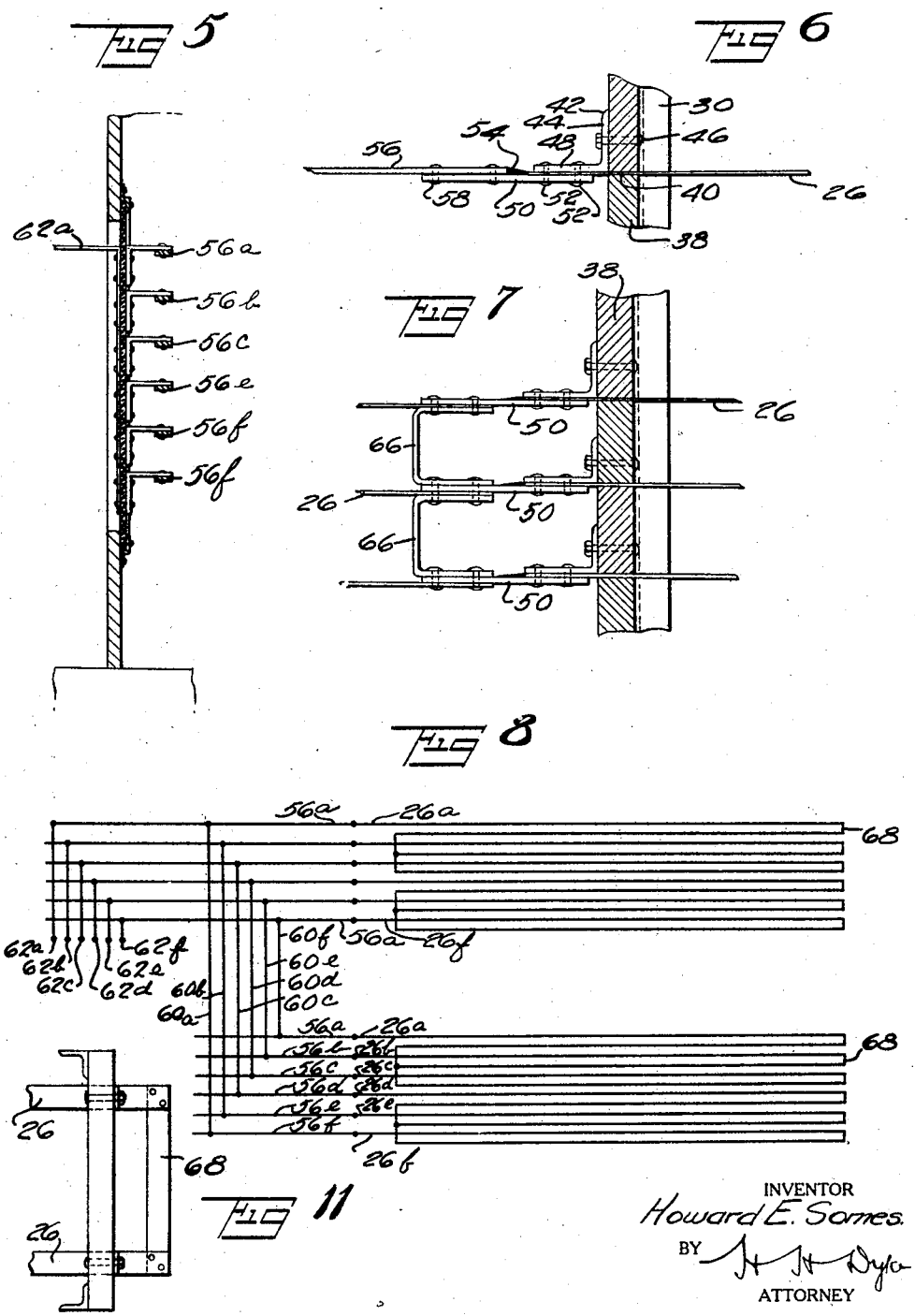

Patented Feb. 1, 1927.

1,616,067

UNITED STATES PATENT OFFICE.

HOWARD E. SOMES, OF PHILIPSE MANOR, NEW YORK.

ELONGATED ELECTRICALLY-HEATED OVEN.

Application filed April 7, 1924. Serial No. 704,556.

My invention relates to elongated electrically heated ovens of the tunnel type, through which objects are passed from end to end and subjected therein to heated air or other heated gases. Enamel baking ovens for automobile parts as fenders, bodies, etc., and through which the objects, on which enamel is to be baked, are carried on conveyors, afford a typical example of ovens in which the invention may be embodied, but same are referred to by way of example only, and not for limitation of the invention.

In such ovens, which may in some instances have a total length of hundreds of feet, it has been the customary practice heretofore to make use of a large number of electrical heaters of the unit type, each but a few feet in length, arranged substantially end to end throughout the length of the oven.

Numerous objections inhere with the use of such unit heaters, particularly for very long ovens, some such objections being the necessity for the provision of a large number of electrical connections, as bus bars and the like, spaced practically throughout the length of the oven, the attendant difficulties in getting same through the oven walls, maintaining proper heat and electrical insulation, etc.

By the present invention, difficulties, such as I have referred to, are eliminated by the provision of elongated electrical heating strips or strands, preferably in ribbon form and extending preferably throughout the length of the oven. With such arrangement the electrical connections may be grouped together, as, for example, they may be confined to the neighborhood of one end of the oven, with merely suitable connections, according to the nature of current supplied, at or about the opposite end of the oven. While such is the preferable arrangement, it will be understood, of course, that in the case of extremely long ovens, for example, there may be more or less subdivision, and the ribbons or other electrical heating strands, while greatly elongated as compared with prior practice may be in two or more lengths; or in some cases, as where the objects are cooled in the tunnel, or extension thereof, by air blast or the like, after leaving the heated zone, the elongated electrical heating elements may extend only part way through the tunnel, which may have, in effect, a cooling tunnel extension of the oven portion of the tunnel, and various other arrangements may be resorted to.

In accordance with my invention the ribbon ends are strongly anchored and supported, and provision is made for clamping and supporting the plural elongated heating strands in spaced relation at spaced intervals throughout their length. In this way any stretching, sagging, buckling or other deformation which may occur in the strands during the successive heatings and coolings to which they are subjected, as when run hot for several hours and the current shut off at night or at other times, is confined to relatively short strand lengths, and the several strands, while preferably arranged relatively close together to make a comparatively compact structure, cannot come into engagement with one another or with the tunnel wall or other adjacent objects, which might cause fires by grounding or shorting the circuit and igniting the enamel or other inflammable objects or materials.

While the present invention substantially avoids any necessity of making use of the customary relatively short heaters of the unit type, it will be understood that, if desired, such unit heaters or a set or bank thereof may be used to supplement the heating effect, secured by the long strand heaters, so as to secure additionally high heats in certain parts of the oven, for example.

Another feature of the invention consists in electrical subdivision of the various elongated strands, particularly for the purpose of heat control. For example, where there are say six of the elongated electrical heating strands in a set, a lesser number, say three of the six may be connected up, as with an ordinary switch, so as to provide a substantially continuous source of heat, and the remaining three strands be connected up separately, as under thermostatic control, it being sufficient, in order to secure control within the desired temperature limits to produce corresponding variations in a number of the heating strands less than the entire number thereof.

Other features and objects of the invention will appear in connection with the description of an embodiment thereof shown in the accompanying drawings, and which, it should be understood, is selected for illustration only and for affording an understanding of the invention and not for limitation thereof.

In said drawings, Fig. 1 is an interrupted side view of an oven with parts broken away to show interior construction, the sectional part being taken substantially on line 1—1, Fig. 2. Fig. 2 is an enlarged cross-section on line 2—2, Fig. 1. Fig. 3 is an isometric view with parts broken away and showing the ribbon supports and connections between the bus bars and the electrical heating elements of ribbon form. Fig. 4 is an isometric view with parts broken away and showing cross bus-bar connections. Fig. 5 is a section on line 5—5, Fig. 1. Fig. 6 is an enlarged detail of connection between one of the bus bars and one of the heating element ribbons. Fig. 7 is an enlarged detail of one form of electrical connection between the electrical heating ribbons of a set. Fig. 8 is a wiring diagram. Fig. 9 is a cross-sectional view showing a modified arrangement of heating element ribbons and Fig. 10 is a detail view showing a unit heater supplementing the elongated ribbon elements for localized extra heating effect. Fig. 11 is a fragmentary plan view on line 11—11, Fig. 1.

The oven or tunnel walls are designated by reference numeral 10. Various means for conveying objects to be baked may be provided and in the form shown posts 12, (Fig. 2) provided with cross-connecting or bracing bars 12$^a$ support the angle iron tracks 14, 14 for a conveyor comprising chains 16, 16, connected by cross-bars 18, 18. The top reach 20 of conveyor chain 16, which receives and carries the objects to be subjected to heat, as enameled automobile parts, bodies, etc., 22 runs on the upper tracks, and the lower or return reach 24 of the conveyor chain 16 runs on the lower tracks (see Fig. 2). The particular form of conveyor shown is more especially adapted for the conveying of parts, such as automobile bodies, and in general the conveyor is properly constructed to carry the objects to be baked.

The elongated heating elements 26 in the form shown are arranged relatively low down within the tunnel or oven and adjacent to the side walls thereof. The arrangement of same at or toward the bottom of the tunnel is desirable so that heat may be effectively delivered by the rising of the heated air and in this way a substantially even temperature may be secured throughout any cross-section of the tunnel, and cool air pockets avoided. The construction of the conveyor and supports is preferably of open or skeleton form in order to facilitate circulation and to secure even heating effect, the form of construction shown and described being well adapted for this purpose. If desired, the heating ribbons may be arranged beneath the conveyor, as shown as 26′, Fig. 9, with a protecting apron or cover 28 over them.

A substantial support 30 is provided for anchoring the ends of the long ribbons 26. In the form shown there are twelve such ribbons on each side of the oven, vertically arranged in six pairs. As shown, the six inner ribbons on a side are connected together in sets of three and the six outer ribbons on the same side are connected to bus bars, and separate end supports are provided for the ribbons of the inner bank, which are interconnected, from those of the outer bank on the same side, which are connected to the bus bars, and the relatively longer ribbons of the latter bank pass through the supporting means of the inner bank without being anchored therein.

The ribbon end supports on each side preferably comprise pairs of angle posts 32, 32 (Fig. 3) securely mounted on stringers 34 and rigidly braced thereto by braces 36. Insulating cross-bars 38 of strong insulating material, such as transite asbestos wood, for example, are secured to the posts 32, as by being bolted thereto, and passages 40 are provided therebetween for the ribbons 26.

In order to secure the ribbons 26 to the cross bars 38, angle plates or brackets 42, 42 are provided, the legs 44 (Fig. 6) thereof being secured as by bolts 46 to the transite cross bars 38, so that the under surface of legs 48 of said brackets 42 are located adjacent to, preferably just above, the strip openings 40.

Holding plates 50 are secured preferably by bolts or rivets 52 to said legs 48 of brackets 40, and strips 26 are passed between bracket legs 48 and plates 50, and thus firmly clamped and held, the fastening members preferably passing through holes provided in strips 26, as well as through bracket legs 48 and plates 50. The extending ends of strips 26 may be welded to plates 50 as indicated at 54 (Fig. 6). Plates 50 extend beyond the brackets 42 and serve for the connection of bus bars 56, as by means of bolts or rivets 58. As will be seen, a firm anchorage for the ribbon is provided enabling same to be securely held and even stretched in place, and the transite blocks 38 being backed up by posts 32, and blocks 38 serving in turn to back up the brackets 40 while posts 32 are securely braced. The arrangement of bus bars, of course, varies with the type of current supplied and with the mode of control, etc. As shown, the outer bank of ribbons 26$^a$, 26$^b$, 26$^c$, 26$^d$, 26$^e$ and 26$^f$ (Fig. 8) on one side are connected to bus bars 56$^a$, 56$^b$, 56$^c$, 56$^d$, 56$^e$ and 56$^f$ respectively, which are cross-connected by crossing bus bars 60$^a$—60$^f$ to a second set of bus bars 56$^a$—56$^f$, connected in turn to ribbons 26$^a$—26$^f$ of the outer bank on the opposite side of the oven. Where triple phase current is used, for example, the terminals 62$^a$—62$^c$ may be connected in by a simple switch and terminals 62^d—62^f connected up with a thermostatic control switch or other arrangements may be used to assure a desired temperature being maintained within the oven.

The inner banks of ribbons in the form shown are similarly anchored to posts 32 (Fig. 3) located toward the interior of the oven as compared with posts 32 for anchoring the ribbons of the outer banks, the ribbons 26^a—26^f passing through openings between the transite blocks 38 of such ribbon anchoring device.

Instead of securing bus bars to the projecting ends of inner ribbons 26^g—26—1, same are preferably connected together in two sets of three ribbons each by preferably U-shaped connecting pieces 66 (Fig. 7) securely riveted or bolted to plates 50, the arrangement being the same as already described for the ribbon anchorage of the outer banks, with the exception of the substitution of members 66 for bus bars 56. At the other ends of ribbons 26 same are preferably anchored and connected up as already described, but in this case the connecting devices serve merely to connect the inner and outer ribbons of each pair, as indicated at 68, Fig. 8.

If desired, additional local heating effect may be secured where desired by the provision of supplementary heaters 64 preferably of the unit type, as shown diagrammatically in Fig. 10.

Means are provided for clamping and supporting the heating elements 26 at spaced intervals throughout their length. In the form shown an angle bar rail 70 (Fig. 2) is supported from the furnace wall 10, and an open metal frame 72 is supported therefrom comprising a horizontal top part 74, a vertical part 76, a lower horizontal part 77 and a clip 78 secured as by a bolt 80 to the furnace wall. The principal part of the weight is carried from the angle bar or rail 70.

The ribbons indicated generally by reference character 26 are clamped and held between pairs of insulating blocks supported over one another in the frames 72, which are adapted to receive and hold two of the strips 26 between them. In the form shown, the pairs of block members comprise under blocks 84, 84 having recesses 86, 86 in their upper faces for reception of ribbons 26 and upper blocks 88, having downwardly extending projections or lugs 90 to enter the recesses 86 in the lower blocks and thereby clamp the ribbons 26 therebetween. Blocks 84, 88 may be made of any suitable, preferably molded, insulating material, the material known as electrobestos being one well adapted for this purpose, but porcelain and various other materials may be used.

Supporting and clamping means are provided for the pairs of blocks 84, 88. In the form shown, same are provided with vertically extending holes 92, through which the rods 94 are passed, there being one or more rods 94 at each end of blocks 84, 88.

The rods 94 extend through the lower or base bar 77 of frame 72 and through a bracket 96 secured to the vertical part 76 of frame 72 and are threaded at one or both ends, so that by screwing nuts thereon pressure can be applied to the pairs of blocks 84, 88 to clamp the ribbons 26 therebetween after the ribbons have been strung in place.

It will be seen that with the construction described and the ribbons supported and clamped at relatively close intervals, same cannot come into contact with one another or with neighboring objects and various other features of advantage referred to above are obtained.

The invention is capable of embodiment in a variety of forms within the scope of the appended claims, and is not to be limited to the specific forms shown for purposes of illustration only.

I claim:

1. An electrical heating oven comprising an elongated tunnel of length many times its diameter, means for conveying coated objects through the tunnel to be dried, a plurality of elongated electrical heating elements arranged to extend substantially horizontally and substantially from end to end of the tunnel, means for supporting the ends of the elements and for connecting same to a source of electrical current, and means arranged at intervals throughout the length of the heating elements for supporting same so as not to sag materially and so as to be held at the points of support against endwise movement.

2. A highly elongated oven of the tunnel type, means therein for conveying along objects to be heated, electrical heating elements extending lengthwise of the oven and substantially from end to end thereof and below and parallel to the conveyer and electrical conducting members connected to said heating elements only in the neighborhood of the end of the oven.

3. A highly elongated oven of the tunnel type, means therein for conveying along objects to be heated, electrical heating elements of strip form within said oven and extending substantially from end to end thereof, means for supporting the said elements to anchor the ends thereof, means spaced apart at intervals for supporting the depending strips and for preventing endwise movement thereof, and electrical connecting members connected to said heating elements and disposed only in the neighborhood of the end of the oven.

4. Means for supporting depending portions of elongated flexible heating elements to extend for a relatively great length in a generally horizontal direction comprising a series of lower and upper insulating members between which the heating elements are passed, and means for applying pressure to clamp all of such members together, whereby the elements are supported and held against endwise movement.

5. A highly elongated oven of the tunnel type, elongated electrical heating elements extending substantially from end to end thereof, said elements being divided into a base bank and a control bank, and electrical connections disposed at the neighborhood of the oven end only for supplying current to the banks of electrical heating elements respectively.

6. In a highly elongated oven of the tunnel type, elongated heating elements extending substantially from end to end thereof, and a supplementary relatively short heating element within said tunnel and adapted with the elongated elements to provide localized higher heat in its neighborhood.

7. In a highly elongated oven of the tunnel type, a conveyor for conveying objects to be heated along within the oven, members of insulating material in the neighborhood of the oven ends, angle brackets on said members, flexible electrical heating elements extending through holes in said members and secured to said angle brackets, pairs of insulating members arranged at spaced intervals in the length of the heating elements for supporting the heating elements, means for clamping said insulating members together to prevent endwise movement of the electrical heating elements, and electrical conducting means secured to the electrical heating elements in the neighborhood of the end of the oven only.

8. A highly elongated oven of the tunnel type, means for conveying objects to be heated along within the tunnel, flexible electrical heating elements extending substantially from end to end of the oven, and end anchoring supports for the electrical heating elements comprising a support of insulating material, a bracket on said support, a plate secured to said bracket with the electrical heating element passing between it and the bracket and held therebetween, and means disposed in the neighborhood of the oven end only for connecting electrical bus bars or the like to said plate.

In testimony whereof, I have signed my name hereto.

HOWARD E. SOMES.